United States Patent [19]
Lange et al.

[11] Patent Number: 5,415,826
[45] Date of Patent: May 16, 1995

[54] METHOD AND DEVICE FOR PRODUCING A PNEUMATIC VEHICLE TIRE

[75] Inventors: Bernd Lange, Hanover; Uwe Ramcke, Walsrode, both of Germany

[73] Assignee: Continental Aktiengesellschaft, Hanover, Germany

[21] Appl. No.: 989,073

[22] Filed: Dec. 11, 1992

[30] Foreign Application Priority Data

Dec. 21, 1991 [DE] Germany .................. 41 42 718.1

[51] Int. Cl.⁶ ............................................ B29C 35/02
[52] U.S. Cl. ............................... 264/501; 264/161; 264/326; 425/32; 425/47; 425/812
[58] Field of Search ............ 264/501, 102, 315, 326, 264/161; 425/44, 47, 812, 46, 32

[56] References Cited
U.S. PATENT DOCUMENTS

| | | | |
|---|---|---|---|
| 3,266,099 | 8/1966 | Buly | 425/812 |
| 3,377,662 | 4/1968 | Fukushima | 425/812 |
| 3,553,790 | 1/1971 | Brobeck et al. | 425/812 |
| 4,895,502 | 1/1990 | Beard et al. | 425/812 |
| 5,059,380 | 10/1991 | Wise et al. | 425/812 |
| 5,075,067 | 12/1991 | Rockarts et al. | 264/326 |
| 5,128,089 | 7/1992 | Lurois | 264/326 |
| 5,234,326 | 8/1993 | Galli et al. | 425/812 |

FOREIGN PATENT DOCUMENTS

| | | |
|---|---|---|
| 0405276 | 1/1991 | European Pat. Off. . |
| 4009500 | 3/1990 | Germany . |
| 63-134207 | 6/1988 | Japan .................. 425/812 |

*Primary Examiner*—Mathieu D. Vargot
*Attorney, Agent, or Firm*—Robert W. Becker & Associates

[57] ABSTRACT

A method and a device for producing pneumatic vehicle tires in a radially divided vulcanization mold provides a space for the excess rubber material outside of the tire contour to be vulcanized and thereby improves the trueness of the vulcanized tire.

22 Claims, 8 Drawing Sheets

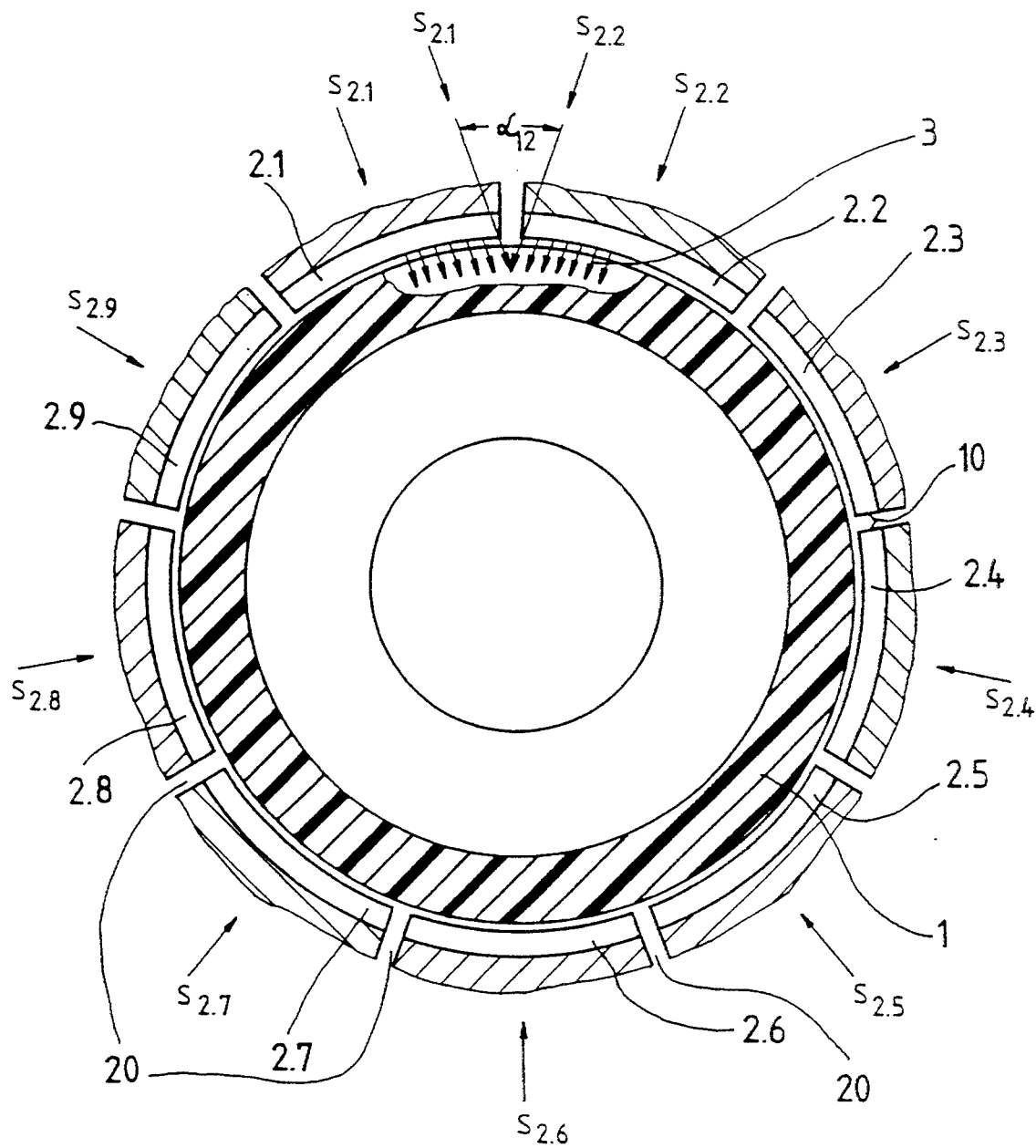

METHOD AND DEVICE FOR PRODUCING A PNEUMATIC VEHICLE TIRE

BACKGROUND OF THE INVENTION

The present invention relates to a method and a device for producing a pneumatic vehicle tire with a radial carcass, belt layers, and a tread from a green tire in a radially divided vulcanization mold having a plurality of radial segments wherein the ratio between a tread portion to be filled by a high interior pressure in the vulcanization mold and the tire tread depth is smaller than 1 so that before completely closing the vulcanization mold the radial segments come into contact with the green tire.

The present invention is based on the prior art represented by European patent 0 405 276 and German Offenlegungsschrift 40 09 500. These prior art documents deal with the problem that during closing of the radial segments of radially divided vulcanization molds the still flowable rubber is forced into the essentially axially extending gaps of the radial segments which form the tread of the vehicle tire resulting in thickened portions at the finished tire product and in a radial force increase when such thickened portions come into contact with the road surface during driving. This results in vibrations of the belt package relative to the bead cores and also, to some extent, in vibrations of the entire wheel suspension system. This problem is especially pronounced with tread profilings extending essentially in the circumferential direction of the tire.

In both prior art documents this problem is solved by providing an increased positive volume at the segment borders in order to accommodate the excess rubber material within the finished tire in a manner which is not detrimental to the trueness of the tire, whereby the aforementioned European patent suggests the extension of the additional volume on both sides of the respective segment border, while the German Offenlegungsschrift has recognized that this is not a necessary requirement and that the additional volume must only be arranged within the area of the segment borders.

Tires that are produced according to these prior art documents demonstrate an excellent behavior with respect to the radial force variations when measured in a quasi-statical method, however, the radial force variations become worse with increasing velocity. This negative effect is more pronounced at non-driven axles than at driven axles. The effect is greater with tires having a hard rubber mixture than with tires comprised of a soft rubber mixture. The problem is most pronounced at non-driven front axles of utility vehicles, especially trucks.

The increase of the radial force variations as a function of the velocity has not been recognized in the prior art, most likely because the body sound conducted through solids and the noise level Generally increase with the velocity and mask this behavior.

It is therefore an object of the present invention to lower the radial force variations especially at higher velocities.

BRIEF DESCRIPTION OF THE DRAWINGS

This object, and other objects and advantages of the present invention, will appear more clearly from the following specification in conjunction with the accompanying drawings, in which:

FIG. 1 shows a cross-sectional view of the zenith of a green tire to be vulcanized that is introduced into an open vulcanization mold;

FIG. 3c shows a portion of a finished tire corresponding to the view of FIG. 3a;

SUMMARY OF THE INVENTION

Figure 2A:
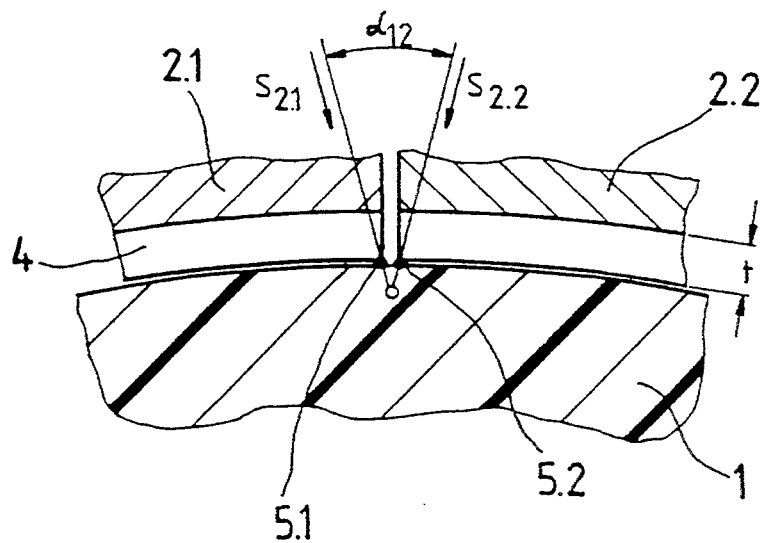
FIG. 2a shows in a detailed view the border area between two segments before the complete closure of the vulcanization mold.

The first method of the present invention for producing a pneumatic vehicle tire with a radial carcass, belt layers, and a tread from a green tire in a radially divided vulcanization mold with a plurality of radial segments is comprised of the following steps:

Introducing the green tire into the vulcanization mold;

Providing a ratio smaller than 1 between the residual carcass lift by the high interior pressure in the vulcanization mold and the tire tread depth, so that before completely closing the vulcanization mold the radial segments come into contact with the Green tire;

Moving the radial segments into a fully closed position in which radially abutting end faces of the radial segments do not completely abut over their entire surface area so that at the radially inwardly oriented portion of the end faces openings through the abutting end faces result;

Forcing rubber essentially radially outwardly through the openings after the high interior pressure in the vulcanization mold has been reached thereby forming rubber projections; and Removing the rubber projections from the pneumatic vehicle tire after completion of vulcanization.

This method may further comprise the steps of positioning the openings within the axial areas in which tread blocks of the tread are formed, and guiding a cutting tool along the periphery of the pneumatic vehicle tire for removing the projections.

In a further embodiment of the first inventive method the following steps may be included:

Providing holes within the radial segments at least within the axial areas in which tread blocks of the tread are formed, the radial segments comprising end portions each extending over at least ten percent of the circumferential length at the inner periphery of the radial segments and a central portion located between the end portions, with a first set of the holes located within the central portion having a cross-sectional area of 0.7 to 3.5 mm² and a second set of holes located within the end portions having a cross-sectional area that is at least 1.5 times as great as the cross-sectional area of the first set;

Forcing rubber into the holes after the high interior pressure in the vulcanization mold has been reached thereby forming further rubber projections; and Removing the further projections from the pneumatic vehicle tire after completion of vulcanization.

Preferably, this method comprises the step of arranging the holes equally spaced from one another over the entire inner surface area of the radial segments, wherein the end portions are between 10 percent and 20 percent of the circumferal length and wherein the cross-sectional area of the holes in the end sections is at least twice as great as the cross-sectional area of the holes in the center portion. In a further specific embodiment of the first inventive method the following steps are included:

Providing holes with an end sections of the radial segments at least within the axial areas in which tread blocks of the tread are formed, the end sections extending over 10% to 20% of the circumferential length at the inner periphery of the radial segments with a center portion located between the end sections, the center portion being free of holes, the holes having a cross-sectional area of 1 to 6 mm$^2$;

Forcing rubber into the holes after the high interior pressure in the vulcanization mold has been reached thereby forming further rubber projections; and Removing the further projections from the pneumatic vehicle tire after completion of vulcanization.

According to another embodiment of the first inventive method, the step of providing behind each opening in the radially outward direction a recess and behind the recess a venting hole having a cross-sectional area that is at most 1/5 of the cross-sectional area of the opening, whereby the opening, the recess, and the venting hole communicate with one another, is included.

A second inventive method comprises the steps of:

Introducing the green tire into the vulcanization mold;

Providing a ratio smaller than 1 between the residual carcass lift by the high interior pressure in the vulcanization mold and the tire tread depth so that before completely closing the vulcanization mold the radial segments come into contact with the green tire;

Providing holes within the radial segments at least within the axial areas in which tread blocks of the tread are formed, the radial segments comprising end sections each corresponding to at least 10% of the circumferential length at the inner periphery of the radial segments and a central portion located between the end sections, with a first set of the holes located within the central portion having a cross-sectional area of 0.7 to 3.5 mm$^2$ and a second set of holes located within the end sections having a cross-sectional area that is at least five times as great as the cross-sectional area of the first set;

Moving the radial segments into a fully closed position;

Forcing rubber into the holes after the high interior pressure in the vulcanization mold has been reached thereby forming rubber projections; and Removing the rubber projections from the pneumatic vehicle tire after completion of vulcanization.

The second method may further comprise the step of continuously increasing the cross-sectional area of the first set and the second set of holes from a circumferential center of the radial segments to the outer edge of the end sections. Preferably, the cross-sectional area is increased according to a parabolic function.

Advantageously, the second method further comprises the step of arranging the holes equally spaced from one another over the entire inner surface area of the radial segments, wherein the end sections are between 10% and 20% of the circumferential length and wherein the cross-sectional area of the holes in the end sections is at least twice as great as the cross-sectional area of the holes in the center portion.

The second method expediently comprises the step of providing behind each hole of the second set in the radially outward direction a recess and behind the recess a venting hole having a cross-sectional area that is at most 1/5 of the cross-sectional area of the opening, wherein the hole, the recess, and the venting hole communicate with one another.

A third inventive method comprises the following steps:

Introducing the Green tire into the vulcanization mold;

Providing a ratio smaller than 1 between the residual carcass lift by the high interior pressure in the vulcanization mold and the tire tread depth so that before completely closing the vulcanization mold the radial segments come into contact with the green tire;

Providing holes only within end sections of the radial segments, the end sections each extending over at least 10% and at most 20% of the circumferential length at the inner periphery of the radial segments, the holes having a cross-sectional area of 1.4 to 8 mm$^2$;

Moving the radial segments into a fully closed position;

Forcing rubber radially outwardly into the holes after the high interior pressure in the vulcanization mold has been reached thereby forming rubber projections; and Removing the rubber projections from the pneumatic vehicle tire after completion of vulcanization.

Expediently, this method further comprises the step of providing behind each hole in the radial outward direction a recess and behind the recess a venting hole having a cross-sectional area that is at most 1/5 of the cross-sectional area of the hole, whereby the hole, the recess and the venting hole communicate with one another.

All three methods have in common that the excess rubber material does not remain within the finished tire product, as is the case for the tire products of the prior art, but is forced essentially radially outwardly and removed after completion of the vulcanization step. In comparison to this common basic idea of the three inventive methods, the differences between the three methods are comparatively small.

All three methods are based on the novel hypothesis that the rubber concentrations of the prior art generated at the segment borders during vulcanization result in greater centrifugal forces acting on these circumferential locations during high speed driving than on other circumferential locations at these locations so that the tire is deformed and no longer round. This deformation is a square function of the velocity whereby radius maxima occur where the segment borders were located at the tire and radius minima occur where the center of the segments were located at the tire. This hypothesis essentially states that irregularities of the centrifugal forces over the circumference of the tire that are caused by high velocities are generated exactly at the locations where according to the quasi-statical measurements of the prior art tires a substantial compensation of the radial force variations has been achieved, thus creating a new defect.

With conventional measuring devices this hypothesis could not be proven because measurements of the radial force variations at high tire revolutions cannot be performed. This is so because the sensors of the devices are too sluggish. However, in the meantime the aforementioned hypothesis has been confirmed with other experiments.

A hole as defined in the present invention refers to an opening having a closed periphery. This periphery must not be a circle as in the special case of a bore. The use of rectangular holes has the advantage that fewer such holes are needed and that the resulting rubber projections can be removed with fewer cuts, that is, in an easier manner.

Preferably, the holes in all three methods and the openings in the first method are limited to the axial areas in which tread blocks of the tread of the pneumatic tire are formed. In this manner, the rubber projections can be very easily removed after completion of the vulcanization step, for example, a separating means (cutting tool) such as a knife can be guided along the tire periphery. The removal of rubber projections from within tire tread Grooves on the other hand requires complicated tools and a complicated guiding mechanism. By limiting the displacement of excess rubber into the area of the tire blocks a uniform mass concentration over the circumference is not inhibited or prevented.

In the second method, in which holes are distributed over the entire circumference, which in the center portion of the radial segments only serve as venting holes, but in the end sections of the radial segments are widened such that the amount of excess rubber which is needed to accomplish the mass compensation can be received, the cross-sectional areas of the holes increase from the circumferential center of the radial segments to the end sections not in an abrupt manner, but at least in a quasi-continuous manner, preferably according to a parabolic function.

The word "quasi", respectively, "continuous" is used in this context in order to take into consideration modifications or embodiments in which the total cross-sectional area of the holes within the area of the end sections is not limited to one single hole, but is comprised of a plurality of holes. Similar to a continuous black-white transition with gray tones in a raster image where the transition from image point to image point is essentially non-continuous, the tone transition thus being only quasi-continuous (i.e., only by ignoring the details of the discreetness of the image points or holes a continuous change is observed), the selected terms must be understood in this sense.

When on the other hand for each tread block area only one single opening or only one single hole is provided, this hole and/or opening should increase its width toward the end section in a continuous manner. For an opening according to the first method, this results in a funnel-shape opening widening toward the segment border.

The variations of the cross-sectional areas of the holes must not be as great when, as provided in the first method, the abutting end faces of the segments have openings.

Due to the rubber flow it seems to be possible to eliminate venting holes within the center portion of the segments, while the radial segments at least in the axial areas in which tread blocks of the .tread are formed are provided with holes within the end sections for receiving excess rubber material and forming rubber projections. The cross-sectional area is preferably between 1 and 6 mm$^2$.

One problem encountered during development of the present invention was to determine exactly the conditions under which the correct amount of rubber would be displaced into the holes and openings. When not enough rubber material is displaced into the openings and holes, the aforementioned detrimental effect of the radial force increase at the tire periphery where the radial segment borders were located are still observed. When too much rubber material is ejected, an overcompensation in the form of a radial force minimum at the tire periphery where the radial segment center portions were located results.

The amount of rubber material to be displaced is influenced by a number of various factors. A steeper increase of the temperature at the beginning of the vulcanization results in a temporarily increased flowability of the rubber material and thus in a greater outflow. The same result is observed when vulcanization accelerators are added in reduced amounts or carbon of a reduced activity (smaller surface area) is employed. The influence of these factors can be avoided by arranging a recess and a venting hole behind the openings or holes in the radially outward direction.

By providing, when viewed in the direction of flow of the rubber material, behind the opening or holes first a recess and then a venting hole having a cross-sectional area $A_e$ that is at most half as great as the cross-sectional area A of the opening or the hole, the flow resistance until the cavernous recess is filled with rubber material is low; however, after filling the cavernous recess the flow resistance is increased due to the smaller cross-sectional area of the venting hole. Since due to the smaller cross-sectional area only easily flowing air will exit, but almost no further rubber material, the volume of the cavernous recess determines the volume of the rubber material that can be displaced essentially independent of the vulcanization process tolerances for the temperature and composition of the rubber material.

The volume of the cavernous recess together with the radially inwardly oriented opening or hole is dimensioned such that it corresponds to the volume of the rubber material to be displaced. For the calculation of the amount of rubber material to be displaced reference is made to the description of the FIGS. 1 and 2.

The aforedescribed three methods require novel vulcanization molds with openings at the abutting end faces or at least within the end sections of the radial segments through which the rubber material can be displaced essentially in the radial direction of the mold.

A first radially divided vulcanization mold of the present invention is comprised of:

A plurality of radial segments having radial end faces, wherein a ratio smaller than 1 between the residual carcass lift by the high interior pressure in the vulcanization mold and the tire tread depth is provided so that before completely closing the vulcanization mold the radial sections come into contact with the green tire inserted into the vulcanization mold;

Each radial segment has portions for forming tread grooves of the pneumatic vehicle tire and axial portions for forming tread blocks;

The radial end faces of neighboring ones of the radial segments abutting when the vulcanization mold is in a fully closed position, with areas of the neighboring end faces corresponding to the axial portions for forming tread grooves of the tread contacting one another in the fully closed position and with at least one area of the end faces corresponding to the axial portions for forming tread blocks of the tread being spaced from one another so as to form an opening; and Wherein rubber is forced out essentially radially outwardly through the opening after the high interior pressure in the vulcanization mold has been reached thereby forming rubber projections that are removed from the pneumatic vehicle tire after completion of vulcanization.

The first vulcanization mold preferably has all of the areas of the end faces corresponding to the axial portions forming tread blocks spaced from one another so as to form one of the openings. Preferably, the first radially divided vulcanization mold further comprises holes within the radial segments, the holes equally spaced from one another over the entire inner surface area of the radial segments, wherein rubber is forced into the holes after the high interior pressure in the vulcanization mold has been reached, thereby forming further rubber projections, and wherein the further projections are removed from the pneumatic vehicle tire after completion of vulcanization. The radial segments comprise end sections extending over 10 to 20% of the circumferential length of the inner periphery of the radial segments and a central portion located between the end sections. A first set of the holes is located within the central portion and has a cross-sectional area of 0.7 to 3.5 mm$^2$, and a second set of holes is located within the end sections and has a cross-sectional area that is at least twice as Great as the cross-sectional area of the first set. Advantageously, the vulcanization mold further comprises behind each opening in the radially outward direction a cavernous recess and behind the cavernous recess a venting hole having a cross-sectional area that is at most 1/5 of the cross-sectional area of the opening . The opening, the cavernous recess, and the venting hole communicate with one another.

A second radially divided vulcanization mold of the present invention comprises:

A plurality of radial segments, wherein a ratio between the residual carcass lift by the high interior pressure in the vulcanization mold and the tire tread depth is smaller than 1 so that before completely closing these vulcanization mold the radial segments come into contact with the green tire inserted in the vulcanization mold;

The radial segments comprising end sections each corresponding to at least 10% of the circumferential length at the inner periphery thereof and a central portion located between the end sections;

The radial segments having holes at least within the axial portion in which tread blocks of a tread are formed having a cross-sectional area of between 0.7 and 3.5 mm$^2$; and A first set of the holes located within the central portion and the second set of the holes located within the end section, the second set of the holes having a cross-sectional area that is at least twice as great as the cross-sectional area of the first set, wherein rubber is forced into the holes after the high interior pressure in the vulcanization mold has been reached thereby forming rubber projections that are removed from the pneumatic vehicle tire after completion of vulcanization.

Preferably, the holes are equally spaced from one another over the entire inner surface area of the radial segments, and the end sections are between 10% and 20% of the circumferential length. Advantageously, the second vulcanization mold further comprises behind each opening in the radially outward direction a cavernous recess and behind the cavernous recess a venting hole having a cross-section area that is at most 1/5 of the cross-sectional area of the opening 8. The opening, the cavernous recess, and the venting hole communicate with one another.

A third radially divided vulcanization mold of the present invention comprises:

A plurality of radial segments wherein a ratio between the residual carcass lift by the high interior pressure in the vulcanization mold and the tire tread depth is smaller than 1 so that before completely closing the vulcanization mold the radial segments come into contact with the green tire;

The radial segments having holes at least within the axial portions in which tread blocks of the tread are formed, the radial segments comprising end sections extending over at least 10% and at most 20% of the circumferential length at the inner periphery of the radial segments, the holes provided only within the end sections and has a cross-sectional area of 1.4 to 8 mm$^2$, wherein rubber is forced into the holes after the high interior pressure in the vulcanization mold has been reached thereby forming rubber projections that are removed from the pneumatic vehicle tire after completion of vulcanization.

Advantageously, the third vulcanization mold also further comprises behind each opening in the radially outward direction a cavernous recess and behind the cavernous recess a venting hole having a cross-sectional area that is at most 1/5 of the cross-sectional area of the opening. The opening, the cavernous recess, and the venting hole communicate with one another.

Since in all known vulcanization methods one of the requirements is to keep the displacement of rubber material as small as possible, the inventive vulcanization molds are usable for nothing but the inventive method.

DESCRIPTION OF PREFERRED EMBODIMENTS

The present invention will now be described in detail with the aid of several specific embodiments utilizing FIGS. 1 through 8.

FIGS. 1 and 2 serve to explain the problem to be solved by the present invention. FIG. 1 is a cross-sectional view of the zenith of a green tire 1 to be vulcanized which is inserted into an open vulcanization mold which is about to be closed. The vulcanization mold comprises nine radial mold segments moving toward the green tire 1 and which are indicated by the common reference numeral 2. Where a differentiation between the nine radial segments is desirable the reference numeral 2 has a further number 1–9 added after a point, i.e., 2.1 to 2.9.

While during the manufacture of tires with small tread depth and Great tread blocks the mold is first completely closed before the radial segments are pressed into the Green tire, i.e., the tread molding takes place only when the remaining tread portion e is filled in, the radial segments for the production of tires for utility vehicles such as truck tires already press into the tire tread portion before the mold is completely closed, i.e., the form segments abut one another to close the mold and form a continuous periphery.

The radial segments 2 are guided such that the respective segment center is moved along a path that is exactly radially oriented. This is indicated by the arrows $s_{2.1}$ to $s_{2.9}$ for each individual radial segment.

Any given point of each individual radial segment 2 moves along a path which is parallel to the path of any other given point during closing of the mold due to the quasi-rigid arrangement of the radial segments 2. This is indicated with a plurality of small arrows 3 in the right half of the radial segment 2.1 and in the left half of the radial segment 2.2. The limitation of the arrows 3 to the designated radial segment halves simplifies the graphical representation of the figure. The aforedescribed movement of the segments, of course, takes place for each one of the individual radial segments 2.

Each local movement 3 can be divided into a radial component and a circumferential component. While the radial component is substantially independent of the distance between the location in question and the segment center, the circumferential component pointing away from the segment center increases approximately as a square function of the distance between the segment location in question and the respective segment center. This results especially within the area of the borders 10 or end sections in a flowing movement of the unvulcanized rubber material toward the borders 10 (end faces of the radial segments 2) as soon as the radial segments 2 with their bars 4 that form the tread grooves press onto the green tire.

The distance between the end faces of the various radial segments 2 is exaggerated in FIG. 1 in order to facilitate the representation. In fact, the gap 20 between the radial segments 2 conventionally is so small at the beginning of the forming process of the tread that almost no rubber material can exit through it. Instead, the rubber material which is displaced toward the segment borders (end faces) 10 remains essentially within the tire itself.

The amount of excess rubber material at the segment end faces (borders) 10, as is shown in FIG. 1, depends on the timing of the beginning of the tread molding relative to the displacement of the radial segments 2 as well as on the tire size and substantially on the angle $\alpha$ between the direction of movement $s_2$ of neighboring radial segments. In the following this angle will be called the closing angle $\alpha$. Between radial segments 2.1 and 2.2 the closing angle $\alpha_{12}$ is shown.

FIG. 2a shows a detailed section of the border area between the segments 2.1 and 2.2 in a position directly before the segments 2 begin to mold the green tire 1. As soon as the closing of the mold proceeds, the bars 4, the height t of which corresponds to the depth of the tire tread groove to be formed, begin to penetrate the green tire 1. Reference numerals $s_{2.1}$ and $s_{2.2}$ indicate the movement of the respective segment edges 5.1 and 5.2.

Figure 2B:
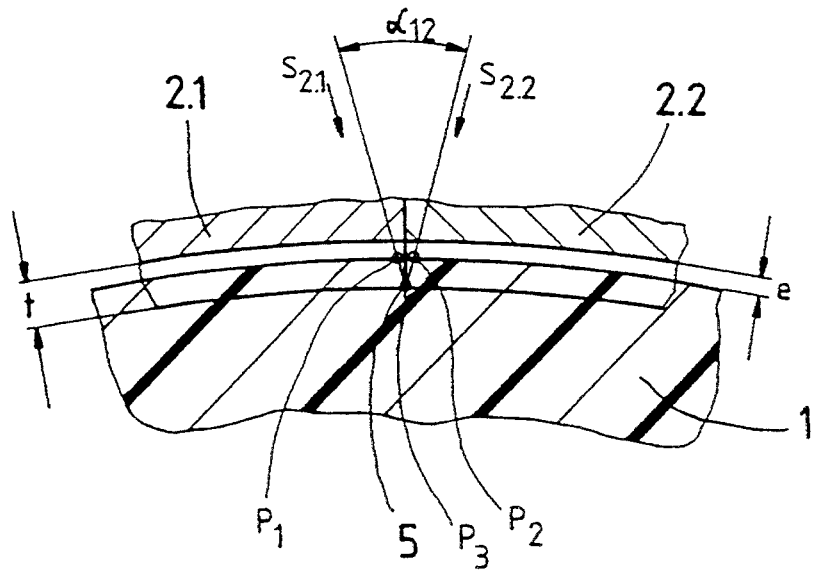
FIG. 2 corresponds to the representation of FIG. 2a showing the vulcanization mold in its closed position.

FIG. 2b corresponds to the same view as FIG. 2a, however, the mold is completely closed. The neighboring, radially inwardly oriented segment edges 5 are now adjacent to one another. A small circle indicates the starting position of the edges 5 (FIG. 2), while in FIG. 2a the small circle indicates the end position of the edges. The triangle extending between these three positions, after integration over the axial extension of the bar 4 penetrating into the green tire, corresponds to the excess rubber material to be displaced. After closing the mold the residual carcass lift e is completed after which the complete tread depth t is achieved. In the drawings, a conventional ratio for truck tires between the residual carcass lift e and the tread depth t of approximately 0.4 is shown.

The remaining Figures show the most important variants of the invention. As in the previously described Figures, FIGS. 3 and 4 show the bars 4 which form the tread grooves arranged outside of the zenith of the tire. This feature does not limit the invention, but merely allows for a simpler representation.

Figure 3A:
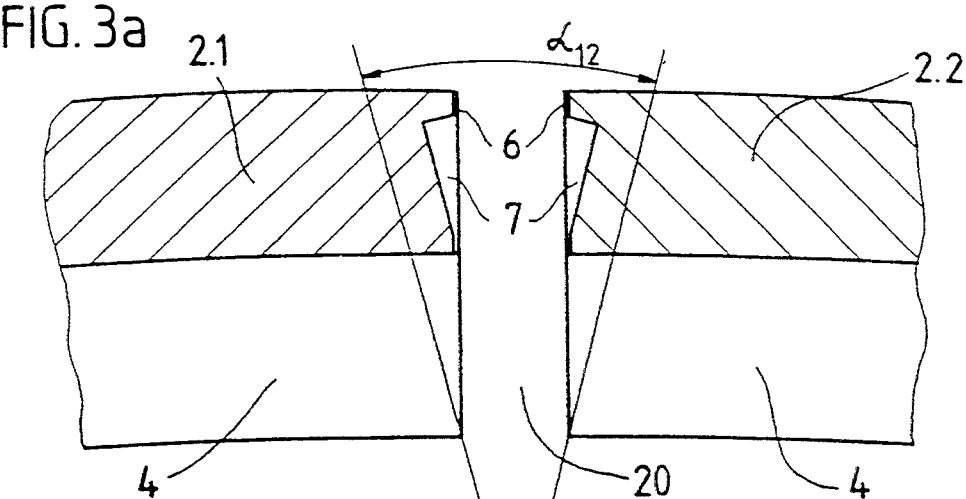
FIG. 3a shows the border between two segments of an inventive vulcanization mold in a circumferential cross-section.

FIG. 3a shows a detail of the border area between radial segments 2.1, 2.2 of an inventive vulcanization mold in a cross-section in the circumferential direction. The section plane extends as in the previously described drawings and in the drawings FIGS. 3b, 3c to be described infra through the zenith of the tire to be vulcanized. The radial segments 2 have bars 4 with a cross-section that is constant over its circumferential extension and does not taper off within the border area of the segments. FIG. 3a shows the vulcanization mold in a still open position with an exaggerated gap 20. The essentially planar end faces 6 have cavernous recesses 7.

Figure 3B:
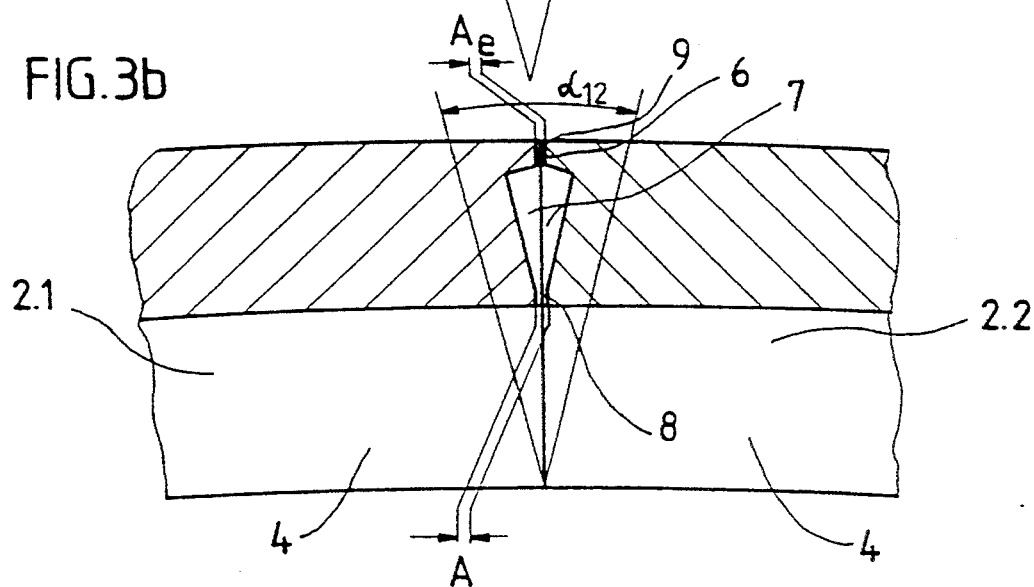
FIG. 3b shows the same segments of FIG. 3a in the closed position.
Figure 4:
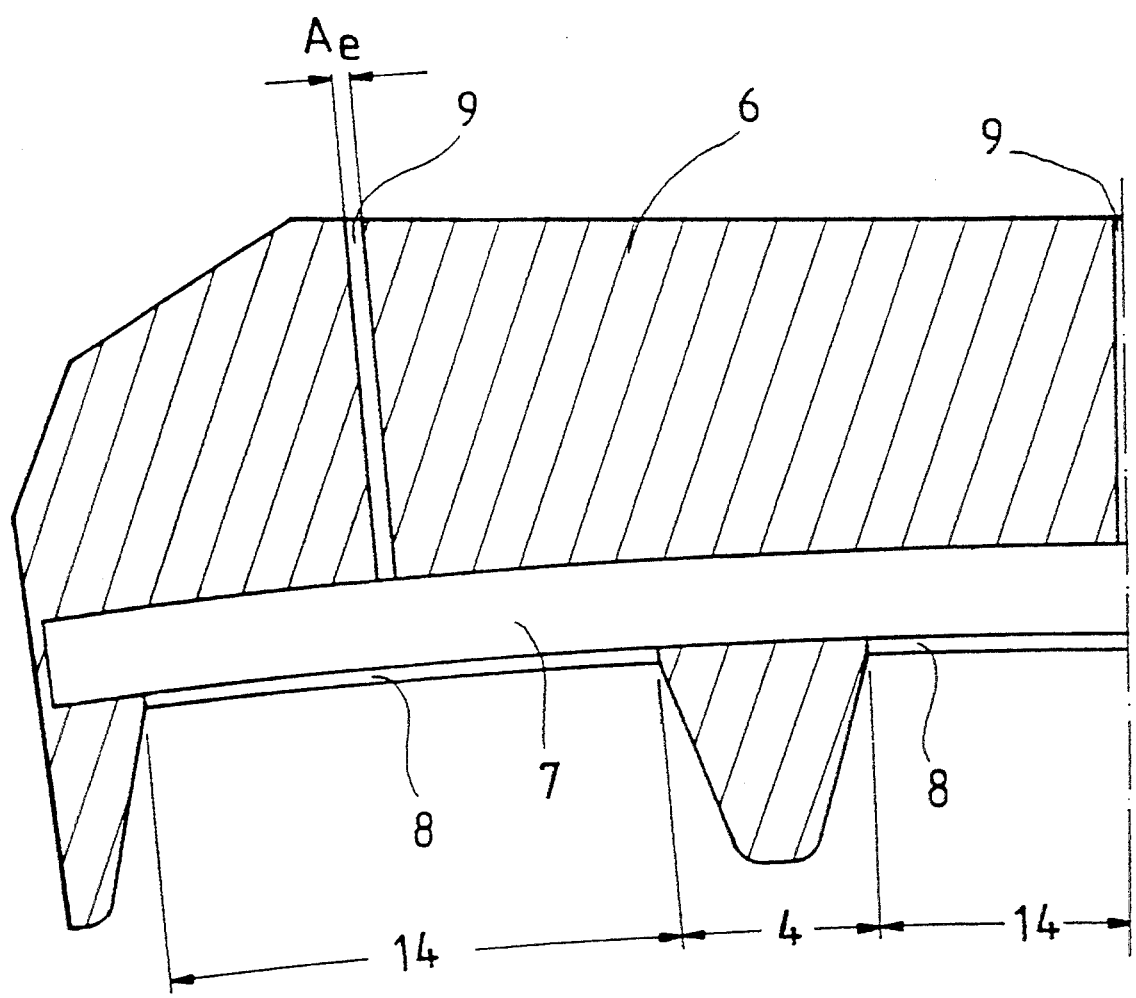
FIG. 4 is an end view of one segment in the circumferential direction.

FIG. 3b shows the same segments 2.1, 2.2 in the closed position. Rubber material may penetrate into the recesses 7 via the openings 8 and the corresponding air volume is forced out through the venting holes 9.

Figure 3C:
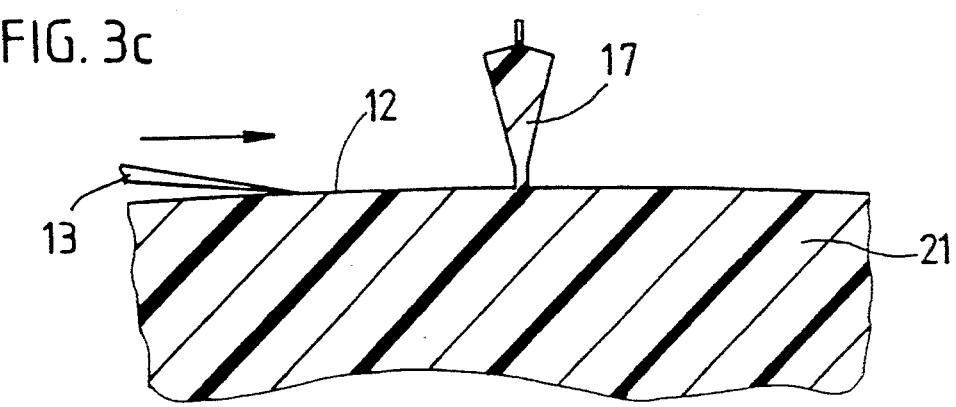

FIG. 3c shows in a corresponding view the produced vulcanized rubber product, i.e., the vulcanized tire 21. The rubber projections 17 are removed from the periphery 12 of the tire by a cutting tool 13. The arrow in the representation represents the direction of movement of the knife 13.

FIG. 4 shows an end view of the left half of a segment in a circumferential direction. The hatching in this representation does not represent sectioned areas, but enhances areas which after closure of the mold come in contact with corresponding areas of the neighboring segment. In order to differentiate the hatching employed in FIG. 4 from conventional hatching, the hatching angle is chosen to be different from the commonly used 45° angle. Areas that are not hatched indicate areas that are below the plane of the paper. These are the limiting areas of the recess 7, the opening 8, and the venting hole 9.

Openings 8 via which the recess 7 communicates with the interior of the mold are arranged exclusively within the axial areas 14 of the vulcanization mold which form the tread blocks of the tread. Within the area of the bars 4 no openings are provided because it is more difficult to remove rubber projections within the tread grooves than at the surface of the tread blocks, i.e., the periphery of the tire.

The recess 7 extends preferably, as can be seen in FIG. 4, into the vicinity of the axial sides without penetrating them. The remaining side portion 16 extending over the entire radial height at the axial sides limits the recess 7 in its axial direction and thus prevents substantially the flow of rubber material from the recess 7 in the axial direction.

In the radially outward direction the recesses 7 communicate with the outer atmosphere via one or a small number of venting holes 9. The cross-sectional area $A_e$ is substantially smaller than the cross-sectional area A of the radially inwardly located openings 8. The ratio between the two cross-sectional areas should be at least 5 to 1 and preferably should be between 10 to 1 and 50 to 1.

While the narrow restriction of the flow of rubber material from the recess 7 to the venting bores 9 limits the volume of the displaceable rubber material to the volume of the recess 7 and thus results in a tolerance insensitiveness, the less restrictive restriction of the rubber flow from the interior of the mold into the openings 8 only limits the size of the areas to be cut after completion of the vulcanization step. When efficient cutting machines are used, a restriction at the opening 8 may be eliminated entirely. It is then possible to employ a very short vulcanization time, be it by increasing the accelerator dosage or by increasing the vulcanization temperature.

The elimination of a restriction of the rubber flow between the interior of the mold and the recess 7 influences the easy removal of the rubber projections only to a small extent when the cross-sectional area provided for the rubber flow is divided into a plurality of individual cross-sections. This basic principle results in the embodiments represented in FIG. 5.

Figure 5:
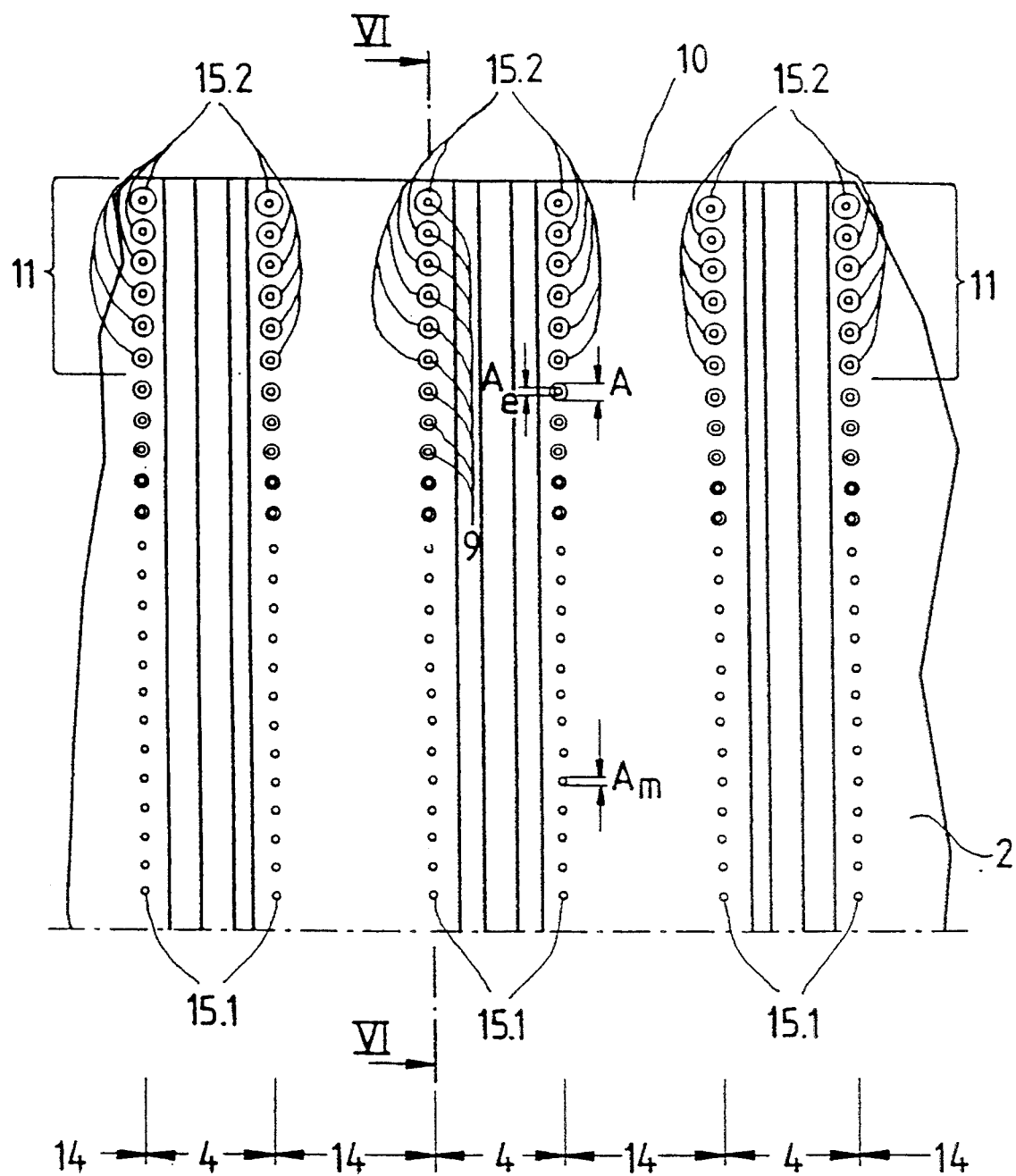
FIG. 5 shows a plan view of the inner surface area of one half of the segment.

FIG. 5 shows a view of the inner surface area of one half of the segment 2 for forming a pneumatic vehicle tire with three circumferential grooves. The rubber material to be displaced in this embodiment is received by a plurality of holes 15.2 which are embodied as "blind bores" open to the interior of the mold and which in this embodiment encompass the inventive openings as well as the inventive recess without intermediate restrictions. The term "blind bore" corresponds well to the optical impression of especially the holes 15.2 within the end sections 11; however, the term is not entirely correct since these blind bores open into small venting holes 9 so that a narrow passage from the interior to the exterior in a radial direction is provided. FIG. 5 represents the aligned (single file) arrangement of such blind holes 15.2 at both sides of a bar 4. The diameter of the blind holes continuously decreases from the segment border 10 to the segment center. Outside of the segment end sections, which in this case correspond to 20% of the circumferential length of the segment, the radially inwardly oriented ends of the holes are no longer wider than the radially outwardly oriented ends. The centrally located holes 15.1 therefore act only as venting holes 9.

Figure 6:
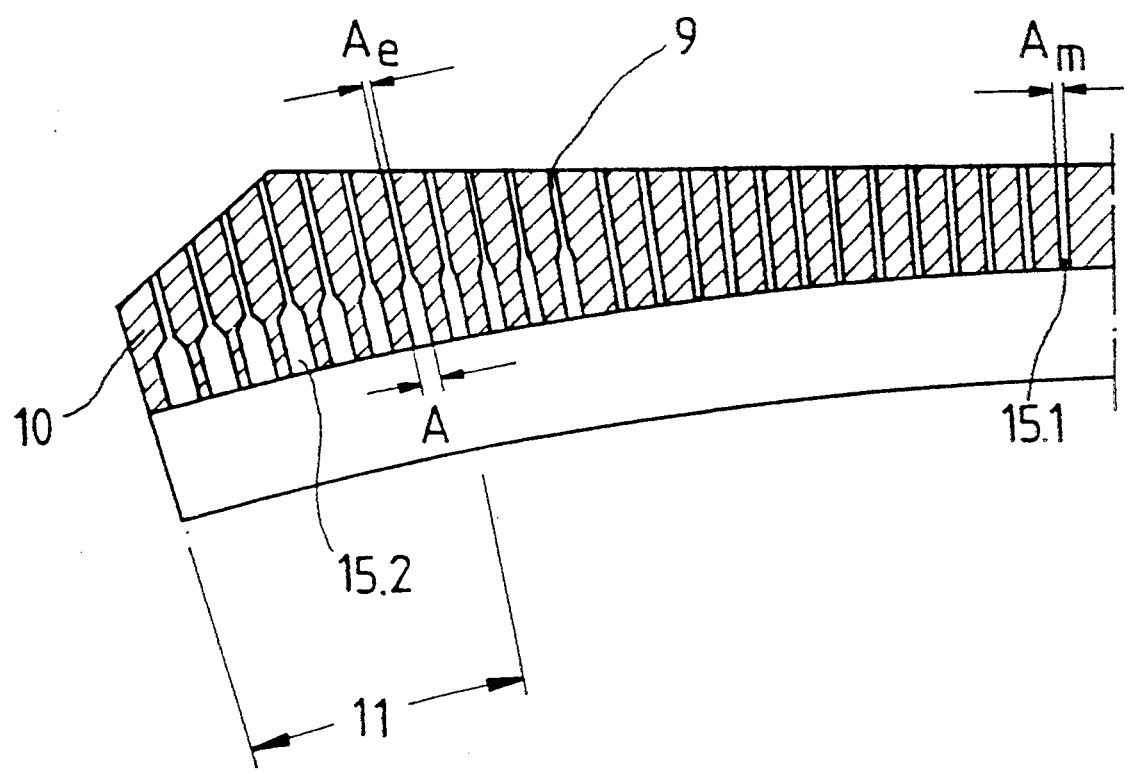
FIG. 6 is a section in the circumferential direction along the line VI—VI of FIG. 5.

FIG. 6 shows in a section in the circumferential direction as indicated at VI—VI in FIG. 5 the same embodiment. The cross-sectional area $A_e$ of the venting bores 9 are preferably identical to the cross-sectional area $A_m$ of the holes 15.1 in the center portion of the radial segment.

Figure 7:
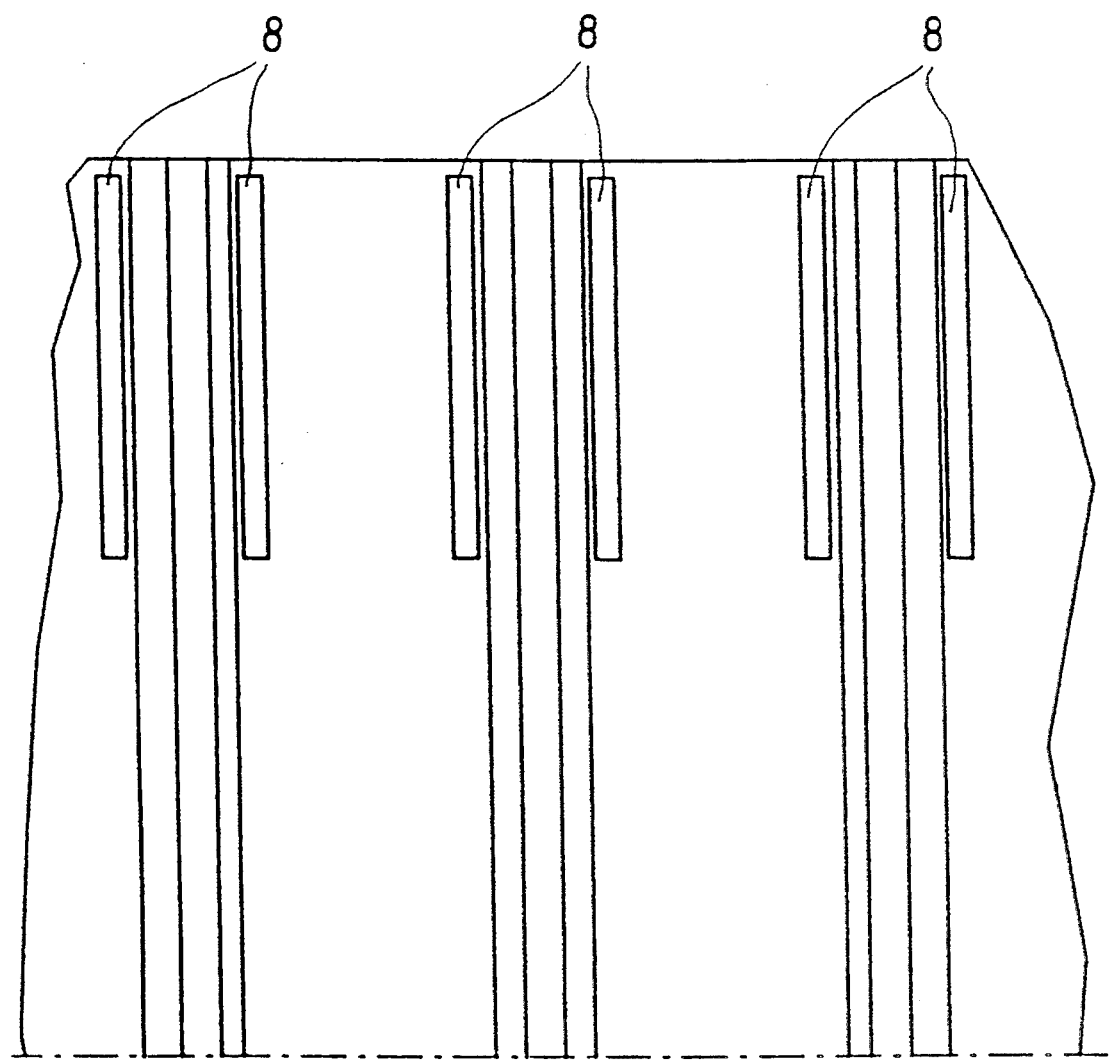
FIG. 7 is a further embodiment in a representation corresponding to FIG. 5.

FIG. 7 shows a further embodiment of the present invention in a representation corresponding to the view of FIG. 5. This embodiment can be derived from the embodiment of FIG. 5 by removing the stays between the individual holes. Due to the reduced detail required for this embodiment the production of such a vulcanization mold is less expensive and for one recess 7 only one venting hole 9 is required.

Figure 8:
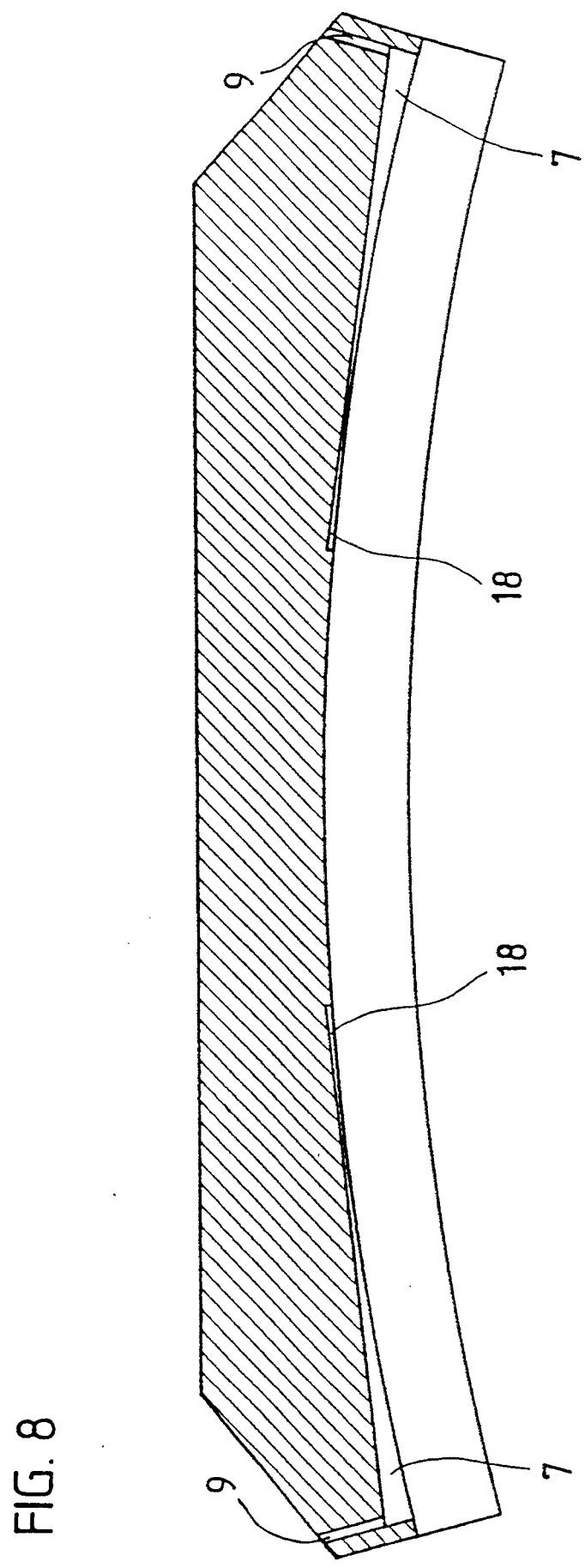
FIG. 8 shows the embodiment of FIG. 7 in a view corresponding to FIG. 6.

FIG. 8 shows a section in the circumferential direction of the embodiment according the view of FIG. 6. The recesses 7 taper off with increasing distance from the segment borders and have a transition into venting extensions 18. Even though outside of the segment borders further venting bores may be provided, in this embodiment they are not necessary. The air to be displaced in this embodiment is vented via two venting holes 9 per bar 4, whereby one venting hole is provided at each segment border.

The invention is not limited to the embodiments represented. The gist of the invention is: A space is provided outside of the finished tire contour for the rubber material flow directed toward the segment border to which the rubber material flows, and the rubber material forms rubber projections which are removed after the vulcanization of the tire.

The present invention is, of course, in no way restricted to the specific disclosure of the specification and drawings, but also encompasses any modifications within the scope of the appended claims.

What we claim is:

1. A method for producing a pneumatic vehicle tire with a radial carcass, belt layers, and a tread from a green tire in a radially divided vulcanization mold with a plurality of radial segments, said method comprising the steps of:

introducing the green tire into the vulcanization mold;

providing a ratio smaller than 1 between a residual carcass lift by the high interior pressure in the vulcanization mold and the tire tread depth, so that before completely closing the vulcanization mold said radial segments come into contact with the green tire;

moving said radial segments into a fully closed position in which radially abutting end faces of said radial segments do not completely abut over their entire surface area so that at the radially inwardly oriented portion of said end faces openings through the abutting end faces result;

forcing rubber essentially radially outwardly through said openings after the high interior pressure in the vulcanization mold has been reached thereby forming rubber projections; and removing said rubber projections from the pneumatic vehicle tire after completion of vulcanization.

2. A method according to claim 1, further comprising the steps of:

positioning said openings only within the axial areas in which tread blocks of the tread are formed; and guiding a cutting tool along the periphery of the pneumatic vehicle tire for removing said projections.

3. A method according to claim 1, further comprising the steps of:

providing holes within said radial segments at least within the axial areas in which tread blocks of the tread are formed, said radial segments comprising end sections each extending over at least 10% of the circumferential length at the inner periphery of said radial segments and a central portion located between said end sections, with a first set of said holes located within said central portion having a cross-sectional area of 0.7 to 3.5 mm² and a second set of said holes located within said end sections having a cross-sectional area that is at least 1.5 times as great as the cross-sectional area of said first set;

forcing rubber into said holes after the high interior pressure in the vulcanization mold has been reached thereby forming further rubber projections; and removing said further projections from the pneumatic vehicle tire after completion of vulcanization.

4. A method according to claim 3, further comprising the step of arranging said holes equally spaced from one another over the entire inner surface area of said radial segments, wherein said end sections are between 10% and 20% of said circumferential length and wherein the cross-sectional area of said holes in said end sections is at least twice as great at the cross-sectional area of said holes in said center portion.

5. A method according to claim 1, further comprising the steps of:

providing holes within end sections of said radial segments at least within the axial areas in which tread blocks of the tread are formed, said end sections extending over 10% to 20% of the circumferential length at the inner periphery of said radial segments with a center portion located between said end sections, said center portion being free of holes, said holes having a cross-sectional area of 1 to 6 mm$^2$;

forcing rubber into said holes after the high interior pressure in the vulcanization mold has been reached thereby forming further rubber projections; and removing said further projections from the pneumatic vehicle tire after completion of vulcanization.

6. A method according to claim 1, further comprising the step of providing behind each said opening in the radially outward direction a recess and behind said recess a venting hole having a cross-sectional area that is at most 1/5 of the cross-sectional area of said opening, with said opening, said recess, and said venting hole communicating with one another.

7. A method for producing a pneumatic vehicle tire with a radial carcass, belt layers, and a tread from a green tire in a radially divided vulcanization mold with a plurality of radial segments, said method comprising the steps of:

introducing the green tire into the vulcanization mold;

providing a ratio smaller than 1 between a residual carcass lift by the high interior pressure in the vulcanization mold and the tire tread depth, so that before completely closing the vulcanization mold said radial segments come into contact with the green tire;

providing holes within said radial segments at least within the axial areas in which tread blocks of the tread are formed, said radial segments comprising end sections each corresponding to at least 10% of the circumferential length at the inner periphery of said radial segments and a central portion located between said end sections, with a first set of said holes located within said central portion having a cross-sectional area of 0.7 to 3.5 mm$^2$ and a second set of said holes located within said end sections having a cross-sectional area that is at least five times as great as the cross-sectional area of said first set;

moving said radial segments into a fully closed position;

forcing rubber into said holes after the high interior pressure in the vulcanization mold has been reached thereby forming rubber projections; and removing said rubber projections from the pneumatic vehicle tire after completion of vulcanization.

8. A method according to claim 7, further comprising the step of continuously increasing the cross-sectional area of said first set and said second set of said holes from a circumferential center of said radial segments to the outer edge of said end sections.

9. A method according to claim 8, further comprising the step of increasing the cross-sectional area according to a parabolic function.

10. A method according to claim 7, further comprising the step of arranging said holes equally spaced from one another over the entire inner surface area of said radial segments, wherein said end sections are between 10% and 20% of said circumferential length and wherein the cross-sectional area of said holes in said end sections is at least twice as great as the cross-sectional area of said holes in said center portion.

11. A method according to claim 7, further comprising the step of providing behind each said hole of said second set in the radially outward direction a recess and behind said recess a venting hole having a cross-sectional area that is at most 1/5 of the cross-sectional area of said opening, said hole, said recess, and said venting hole communicating with one another.

12. A method for producing a pneumatic vehicle tire with a radial carcass, belt layers, and a tread from a green tire in a radially divided vulcanization mold with a plurality of radial segments, said method comprising the steps of:

introducing the green tire into the vulcanization mold;

providing a ratio smaller than 1 between a residual carcass lift by the high interior pressure in the vulcanization mold and the tire tread depth, so that before completely closing the vulcanization mold said radial segments come into contact with the green tire;

providing holes only within end sections of said radial segments, said end sections each extending over at least 10% and at most 20% of the circumferential length at the inner periphery of said radial segments, said holes having a cross-sectional area of 1.4 to 8 mm$^2$;

moving said radial segments into a fully closed position;

forcing rubber radially outwardly into said holes after the high interior pressure in the vulcanization mold has been reached thereby forming rubber projections; and removing said rubber projections from the pneumatic vehicle tire after completion of vulcanization.

13. A method according to claim 12, further comprising the step of providing behind each said hole in the radially outward direction a recess and behind said recess a venting hole having a cross-sectional area that is at most 1/5 of the cross-sectional area of said hole, said hole, said recess, and said venting hole communicating with one another.

14. A radially divided vulcanization mold for producing a pneumatic vehicle tire with a radial carcass, belt layers, and a tread from a green tire, said vulcanization mold comprising:

a plurality of radial segments having radial end faces, wherein a ratio between a residual carcass lift by the high interior pressure in the vulcanization mold and the tire tread depth is smaller than 1, so that before completely closing said vulcanization mold said radial segments come into contact with the green tire inserted in the vulcanization mold;

each said radial segment having portions for forming tread grooves of the pneumatic vehicle tire and axial portions for forming tread blocks;

said radial end faces of neighboring ones of said radial segments abutting when said vulcanization mold is in a fully closed position, with areas of said neighboring end faces corresponding to said axial portions for forming tread grooves of the tread contacting one another in said fully closed position and with at least one area of said end faces corresponding to said axial portions for forming tread blocks of the tread being spaced from one another so as to form an opening; and wherein rubber is forced out essentially radially outwardly through said opening after the high interior pressure in said vulcanization mold has been reached thereby forming rubber projections that are removed from the pneumatic vehicle tire after completion of vulcanization.

15. A radially divided vulcanization mold according to claim 14, wherein all of said areas of said end faces corresponding to said axial portions for forming tread blocks are spaced from one another so as to form one of said openings.

16. A radially divided vulcanization mold according to claim 14, further comprising:

holes within said radial segments, said holes equally spaced from one another over the entire inner surface area of said radial segments, wherein rubber is forced into said holes after the high interior pressure in the vulcanization mold has been reached thereby forming further rubber projections and wherein said further projections are removed from the pneumatic vehicle tire after completion of vulcanization;

said radial segments comprising end sections extending over 10% to 20% of the circumferential length of the inner periphery of said radial segments and a central portion located between said end sections; and a first set of said holes located within said central portion having a cross-sectional area of 0.7 to 3.5 mm$^2$ and a second set of said holes located within said end sections having a cross-sectional area that is at least twice as great as the cross-sectional area of said first set.

17. A vulcanization mold according to claim 14, further comprising behind each said opening in the radially outward direction a cavernous recess and behind said cavernous recess a venting hole having a cross-sectional area that is at most 1/5 of the cross-sectional area of said opening, said opening, said cavernous recess, and said venting hole communicating with one another.

18. A radially divided vulcanization mold for producing a pneumatic vehicle tire with a radial carcass, belt layers, and a tread from a green tire, said vulcanization mold comprising:

a plurality of radial segments, wherein a ratio between a residual carcass lift by the high interior pressure in said vulcanization mold and the tire tread depth is smaller than 1, so that before completely closing said vulcanization mold said radial segments come into contact with the green tire inserted in the vulcanization mold;

said radial segments comprising end sections each corresponding to at least 10% of the circumferential length at the inner periphery thereof and a central portion located between said end sections;

said radial segments having holes at least within the axial portions in which tread blocks of the tread are formed having a cross-sectional area of between 0.7 and 3.5 mm$^2$; and a first set of said holes located within said central portion and a second set of said holes located within said end sections, said second set of said holes having a cross-sectional area that is at least twice as great as the cross-sectional area of said first set, wherein rubber is forced into said holes after the high interior pressure in the vulcanization mold has been reached thereby forming rubber projections that are removed from the pneumatic vehicle tire after completion of vulcanization.

19. A vulcanization mold according to claim 18, wherein said holes are equally spaced from one another over the entire inner surface area of said radial segments, and wherein said end sections are between 10% and 20% of said circumferential length.

20. A vulcanization mold according to claim 18, further comprising behind each said opening in the radially outward direction a cavernous recess and behind said recess a venting hole having a cross-sectional area that is at most 1/5 of the cross-sectional area of said opening, said opening, said recess, and said venting hole communicating with one another.

21. A radially divided vulcanization mold for producing a pneumatic vehicle tire with a radial carcass, belt layers, and a tread from a green tire, said vulcanization mold comprising:

a plurality of radial segments wherein a ratio between a residual carcass lift by the high interior pressure in the vulcanization mold and the tire tread depth is smaller than 1, so that before completely closing the vulcanization mold said radial segments come into contact with the green tire;

said radial segments having holes at least within the axial portions in which tread blocks of the tread are formed, said radial segments comprising end sections extending over at least 10% and at most 20% of the circumferential length at the inner periphery of said radial segments, said holes provided only within said end sections and having a cross-sectional area of 1.4 to 8 mm$^2$, wherein rubber is forced into said holes after the high interior pressure in said vulcanization mold has been reached thereby forming rubber projections that are removed from the pneumatic vehicle tire after completion of vulcanization.

22. A vulcanization mold according to claim 21, further comprising behind each said opening in the radially outward direction a cavernous recess and behind said recess a venting hole having a cross-sectional area that is at most 1/5 of the cross-sectional area of said opening, said opening, said recess, and said venting hole communicating with one another.

* * * * *